US012665319B2

(12) United States Patent
Neenan et al.

(10) Patent No.: US 12,665,319 B2
(45) Date of Patent: Jun. 23, 2026

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); George Alexander Bednekoff, Plano, TX (US); Rauhon Ahmed Shaik, Wylie, TX (US)

(73) Assignee: Parsec Technologies, Inc., Plano, TX (US)

( * ) Notice: Subject to any disclaimer, the term of this patent is extended or adjusted under 35 U.S.C. 154(b) by 65 days.

(21) Appl. No.: 18/447,193

(22) Filed: Aug. 9, 2023

(65) Prior Publication Data

US 2024/0113451 A1 Apr. 4, 2024

Related U.S. Application Data

(60) Provisional application No. 63/371,069, filed on Aug. 10, 2022.

(51) Int. Cl.

*H01Q 21/28* (2006.01)
*H01Q 5/314* (2015.01)

(Continued)

(52) U.S. Cl.

CPC ............. *H01Q 21/28* (2013.01); *H01Q 5/314* (2015.01); *H01Q 7/00* (2013.01); *H01Q 9/42* (2013.01); *H01Q 1/241* (2013.01)

(58) Field of Classification Search

CPC .......... H01Q 21/28; H01Q 5/314; H01Q 7/00; H01Q 9/42; H01Q 1/241; H01Q 1/48;

(Continued)

(56) References Cited

U.S. PATENT DOCUMENTS 5,966,102 A 10/1999 Runyon
6,067,053 A * 5/2000 Runyon ............... H01Q 21/205 343/820

(Continued)

FOREIGN PATENT DOCUMENTS

CN 102097674 6/2011
CN 102468529 5/2012

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

(Continued)

*Primary Examiner* — Dimary S Lopez Cruz
*Assistant Examiner* — Michael M Bouizza
(74) *Attorney, Agent, or Firm* — Knobbe, Martens, Olson & Bear, LLP

(57) ABSTRACT

An antenna assembly can include a front cover, a back cover, and one or more ground reference portions with one or more feed networks positioned between the front cover and the back cover. The antenna assembly can include a first antenna array and a second antenna array coupled to the one or more ground reference portions. The antenna arrays can be an ultra-wide band directional antenna array for mobile and client based application for the wireless telecommunication marketplace. The first antenna and second antenna arrays can two orthogonal polarizations, each covering 1800 to 4200 MHz, a 2.3:1 bandwidth. The ultra-wide band directional antenna array can have ultra-wide bandwidth and narrow elevation and azimuth beamwidths which can allow for an enhancement in the link budget between the base station and the mobile or client by increasing the signal (Continued)

strength from the basestation and decreasing the received signal strength from interfering sources.

19 Claims, 7 Drawing Sheets

(51) Int. Cl.
*H01Q 7/00* (2006.01)
*H01Q 9/42* (2006.01)
*H01Q 1/24* (2006.01)

(58) Field of Classification Search
CPC ...... H01Q 21/062; H01Q 21/24; H01Q 21/26; H01Q 25/001; H01Q 1/246; H01Q 5/00; H01Q 5/48; H01Q 21/30
See application file for complete search history.

(56) References Cited

U.S. PATENT DOCUMENTS 6,111,550 A 8/2000 Miller et al.
9,379,453 B2 6/2016 Rentz
10,224,615 B2 3/2019 Wu
10,312,583 B2 6/2019 Ng
11,251,539 B2 2/2022 Hinman
11,283,149 B2 3/2022 Neenan et al.
11,329,363 B1 5/2022 Neenan et al.
11,658,382 B2 5/2023 Neenan et al.
11,664,574 B2 5/2023 Neenan et al.
11,909,090 B2 2/2024 Neenan et al.
11,936,094 B2 3/2024 Neenan et al.
12,057,641 B2 8/2024 Neenan et al.
12,212,035 B2 1/2025 Neenan et al.
12,266,845 B2 4/2025 Neenan et al.
2010/0253584 A1 10/2010 Yang et al.
2011/0080323 A1 4/2011 Thiam
2011/0102278 A1 5/2011 Rozan
2012/0146872 A1 6/2012 Chainon et al.
2012/0280882 A1* 11/2012 Zimmerman ...... H01Q 21/0025 343/835
2014/0139387 A1 5/2014 Jones et al.
2014/0375507 A1 12/2014 Lin et al.
2015/0042521 A1 2/2015 Hazen
2015/0102974 A1 4/2015 Stoytchev et al.
2016/0172750 A1 6/2016 Ng
2016/0248148 A1 8/2016 Hill et al.
2016/0277062 A1 9/2016 Cheon et al.
2016/0285161 A1 9/2016 Apaydin et al.
2017/0062952 A1* 3/2017 Sundararajan ......... H01Q 1/246
2017/0237158 A1 8/2017 Gibson et al.
2017/0317428 A1* 11/2017 Petropoulos ......... H01Q 21/065
2017/0324171 A1 11/2017 Shehan
2017/0358842 A1* 12/2017 Shehan .................... H01Q 5/30
2018/0062731 A1 3/2018 Ng et al.
2018/0083348 A1 3/2018 Thiam et al.
2018/0109006 A1 4/2018 Ng et al.
2018/0323513 A1 11/2018 Varnoosfaderani et al.
2019/0148825 A1 5/2019 Huerta et al.
2019/0237850 A1 8/2019 Fleischer et al.
2019/0305406 A1 10/2019 Williams
2019/0341674 A1 11/2019 Rosenthal et al.
2019/0356051 A1 11/2019 Barrera et al.
2020/0112101 A1 4/2020 Yun
2020/0350664 A1 11/2020 Thill
2020/0373668 A1* 11/2020 Wu ........................ H01Q 9/285
2020/0411972 A1 12/2020 Hicks et al.
2021/0305718 A1* 9/2021 Li ............................ H01Q 5/48
2021/0391655 A1 12/2021 Brobston et al.
2022/0384966 A1 12/2022 Chiang et al.
2023/0055367 A1 2/2023 Neenan et al.
2023/0145053 A1 5/2023 Kilbury et al.
2023/0223709 A1 7/2023 Guntupalli
2023/0402732 A1 12/2023 Neenan et al.
2023/0402733 A1 12/2023 Neenan et al.
2024/0097339 A1 3/2024 Khatua
2024/0113450 A1 4/2024 Neenan et al.
2024/0128644 A1 4/2024 Neenan et al.
2024/0304958 A1 9/2024 Matsumura
2025/0167459 A1 5/2025 Neenan et al.

FOREIGN PATENT DOCUMENTS

CN 203562507 4/2014
CN 105281049 1/2016
CN 210806018 6/2020
CN 212303910 1/2021
CN 114465021 5/2022
CN 116151285 5/2023
DE 202017002307 U1 8/2017
EP 0 349 499 1/1990
EP 3 474 376 4/2019
EP 3 614 491 2/2020
KR 102260880 6/2021
WO WO 2005/062422 7/2005
WO WO 2013/090783 6/2013
WO WO 2018/140305 8/2018
WO WO 2020/010039 1/2020
WO WO 2023/128683 7/2023
WO WO 2024/035801 2/2024
WO WO 2024/035805 2/2024
WO WO 2024/035810 2/2024

OTHER PUBLICATIONS

International Search Report and Written Opinion issued in PCT Application No. PCT/US2023/029873, dated Nov. 8, 2023, in 15 pages.

* cited by examiner

ANTENNA SYSTEMS

INCORPORATION BY REFERENCE TO ANY PRIORITY APPLICATIONS

The present application claims priority benefit to U.S. Provisional Application No. 63/371,069, filed Aug. 10, 2022, entitled "ANTENNA SYSTEMS", which is hereby incorporated herein by reference in its entirety. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, Long Term Evolution (LTE) has become a standard in wireless data communications technology. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennae that are configured to electromagnetically resonate at frequencies within the dedicated bandwidth. As more wireless devices are used on a frequency bandwidth, a communication bottleneck occurs as wireless devices compete for frequency channels within a dedicated bandwidth. LTE frequency bands range from 450 MHz to 6 GHz, however, antennas configured to resonate within this spectrum only resonate within a portion of the full LTE spectrum. To capture a greater portion of the LTE spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems, which can result in systems with poor functionality and/or coverage.

SUMMARY

This disclosure relates to antennas that cover multiple frequency bands that are prolific in today's telecommunication wireless spectrum. The advances of telecommunications wireless devices have expanded the number of frequency bands that a radio can support for prolific coverage. Frequency bands above 1 GHz are used to offload data from the sub-1 GHz bands which are most often used to provide ubiquitous wireless coverage. Operators strive to provide a best-in-class user experience for a last mile wireless internet service. Using wireless spectrum in an efficient manner above 1 GHz to provide that level of service is extraordinary and novel for today's wireless telecommunication providers.

According to some advantageous embodiments, an ultra-wide band directional antenna array for mobile and client-based applications for the wireless telecommunication marketplace has a feed point, a grounding location, a tuning tap, a first portion for a balanced feed, a second portion for a balanced feed, two portions for radiation, and a common ground reference. The ground reference for the feed network serves a dual purpose for the reflector for the radiating portions. According to some preferred embodiments, some or all of the radiating portions for a distinct polarization are identical. This advantageously allows for streamlined manufacturing process for an antenna that has two orthogonal polarizations, each preferably covering from about 1800 MHz to about 4200 MHz, a 2.3:1 bandwidth. According to some embodiments, the ultra-wide bandwidth and narrow elevation and azimuth beamwidths allow for an enhancement in the link budget between the base station and the mobile or client by increasing the signal strength from the base station and decreasing the received signal strength from interfering sources. Accordingly, in some embodiments, this increases the signal to noise ratio which increases the data rate and allows for lower transmitted power levels which benefits all users in the wireless network. Additionally, the ultra-wide bandwidth allows for the client to receive and transmit radio signals across multiple LTE frequency bands which allows for frequency agility and frequency aggregation which further enhances the user experience. According to some embodiments, an ultra-wide band directional antenna array comprises two feeding network portions, a ground reference portion, four mounting tap portions, four balun portions, four dipole arm portions, two interlocking slot portions, thirty-six top side grounding portions, and thirty-six tune tap portions.

According to some advantageous embodiments, an antenna assembly can include a front cover, a back cover, and one or more ground reference portions with one or more feed networks positioned between the front cover and the back cover. The antenna assembly can include a first antenna array and a second antenna array coupled to the one or more ground reference portions. The antenna arrays can be an ultra-wide band directional antenna array for mobile and client based application for the wireless telecommunication marketplace. The first antenna and second antenna arrays can two orthogonal polarizations, each covering 1800 to 4200 MHz, a 2.3:1 bandwidth. The ultra-wide band directional antenna array can have ultra-wide bandwidth and narrow elevation and azimuth beamwidths which can allow for an enhancement in the link budget between the base station and the mobile or client by increasing the signal strength from the basestation and decreasing the received signal strength from interfering sources.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present disclosure in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1A:
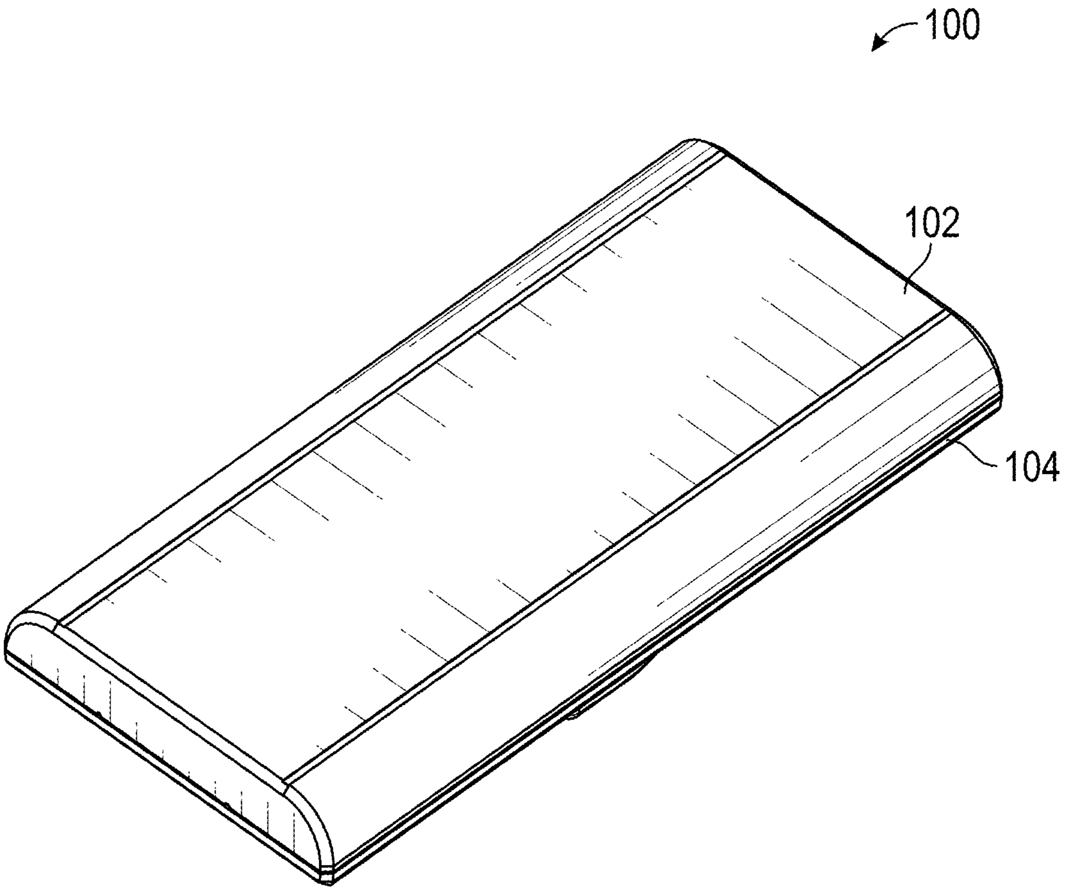
FIG. 1A illustrates a top perspective view of an antenna system enveloped by a non-conductive cover in accordance with some aspects according to some embodiments.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENTS

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present disclosure overcomes problems commonly associated with traditional antenna systems. In particular, the system of the present application discloses an antenna system having a front cover, a back cover, a first ground reference portion positioned between the front cover and the back cover; and a first antenna array coupled to the first ground reference portion, the first antenna array comprising a plurality of first antennas. In some cases, the antenna system can include a second ground reference portion positioned between the front cover and the back cover and a second antenna array coupled to the second ground reference portion, the second antenna array comprising a plurality of second antennas. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary embodiment, however, alternate embodiments having scaled and proportional dimensions of the presented exemplary embodiment are also considered. Additional features and functions are illustrated and discussed below.

Figure 1B:
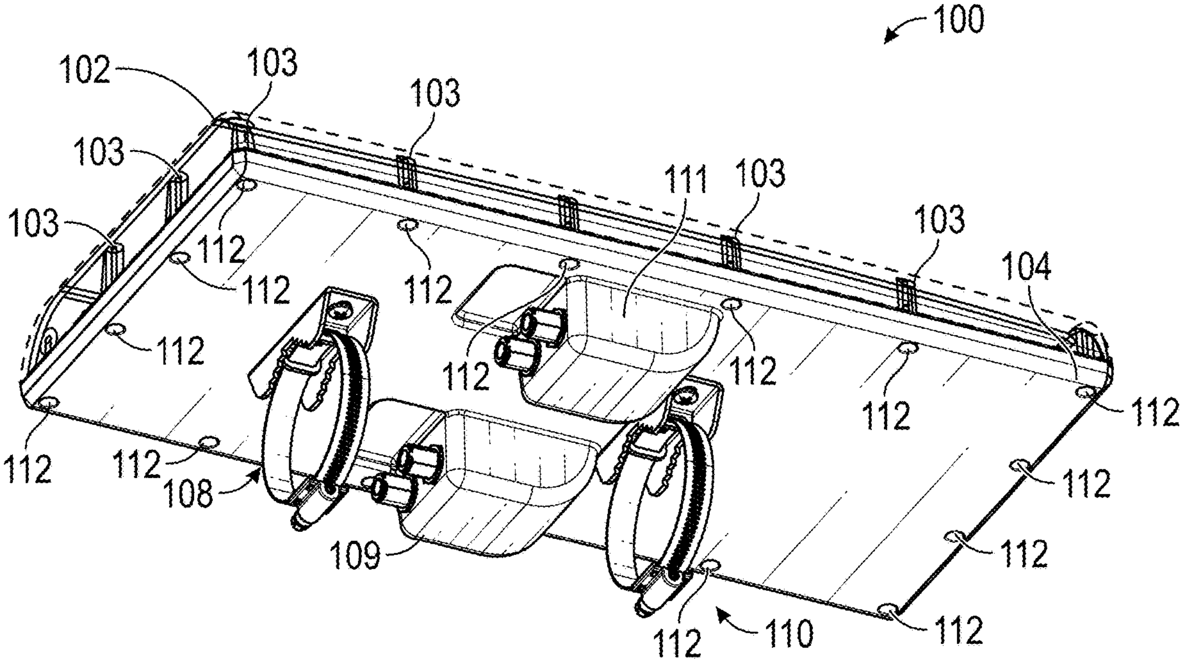
FIG. 1B illustrates a bottom perspective view of the antenna system of FIG. 1, in accordance with some aspects of this disclosure.
Figure 2:
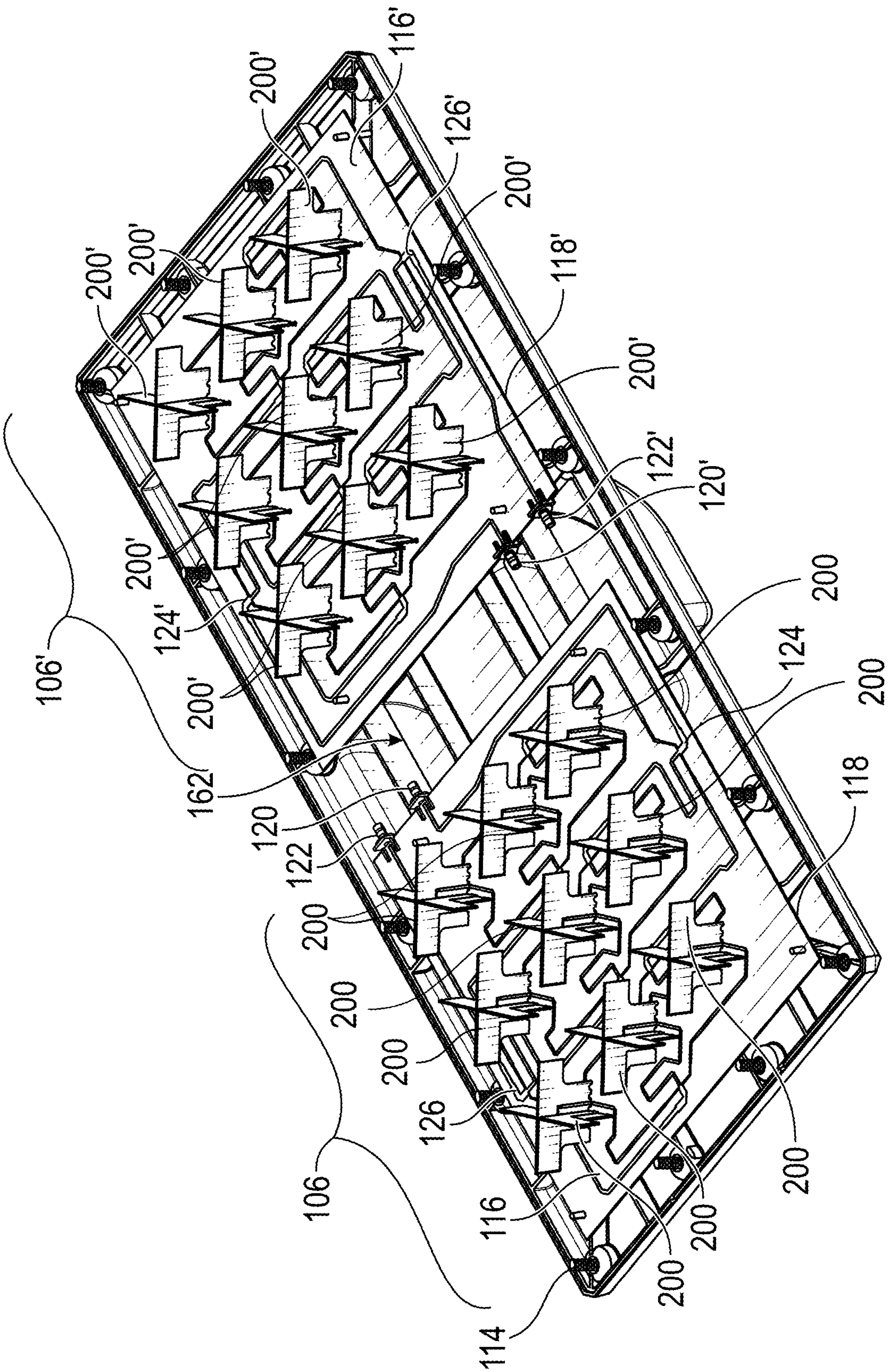
FIG. 2 illustrates a perspective view of the antenna system of FIG. 1, with the non-conductive cover removed, in accordance with some aspects of this disclosure.
Figure 5:
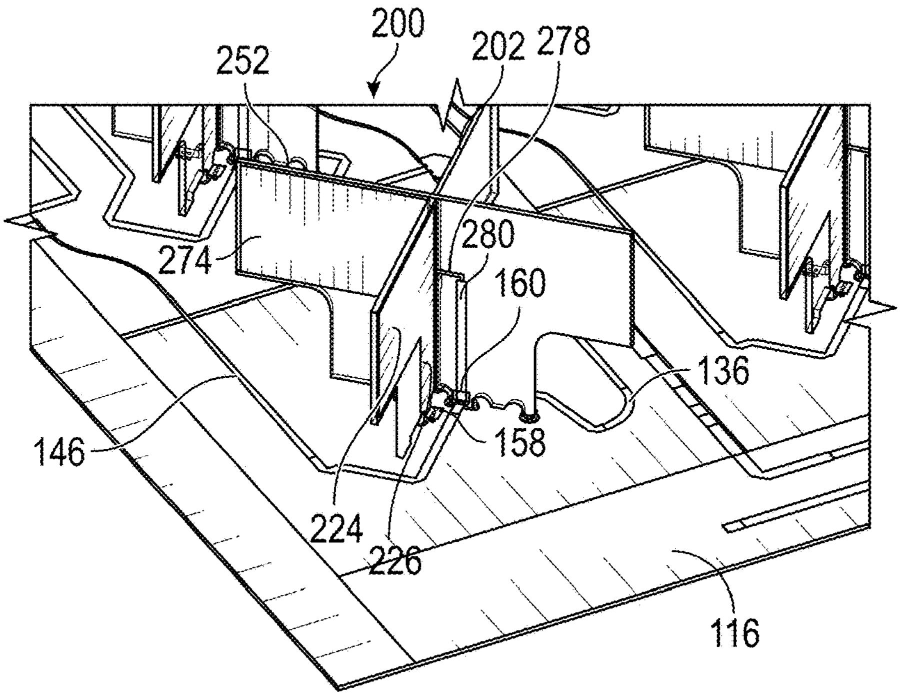
FIG. 5 illustrates a perspective isolation view on an antenna on a PCB base of the antenna system of FIG. 1, in accordance with some aspects of this disclosure.
Figure 6:
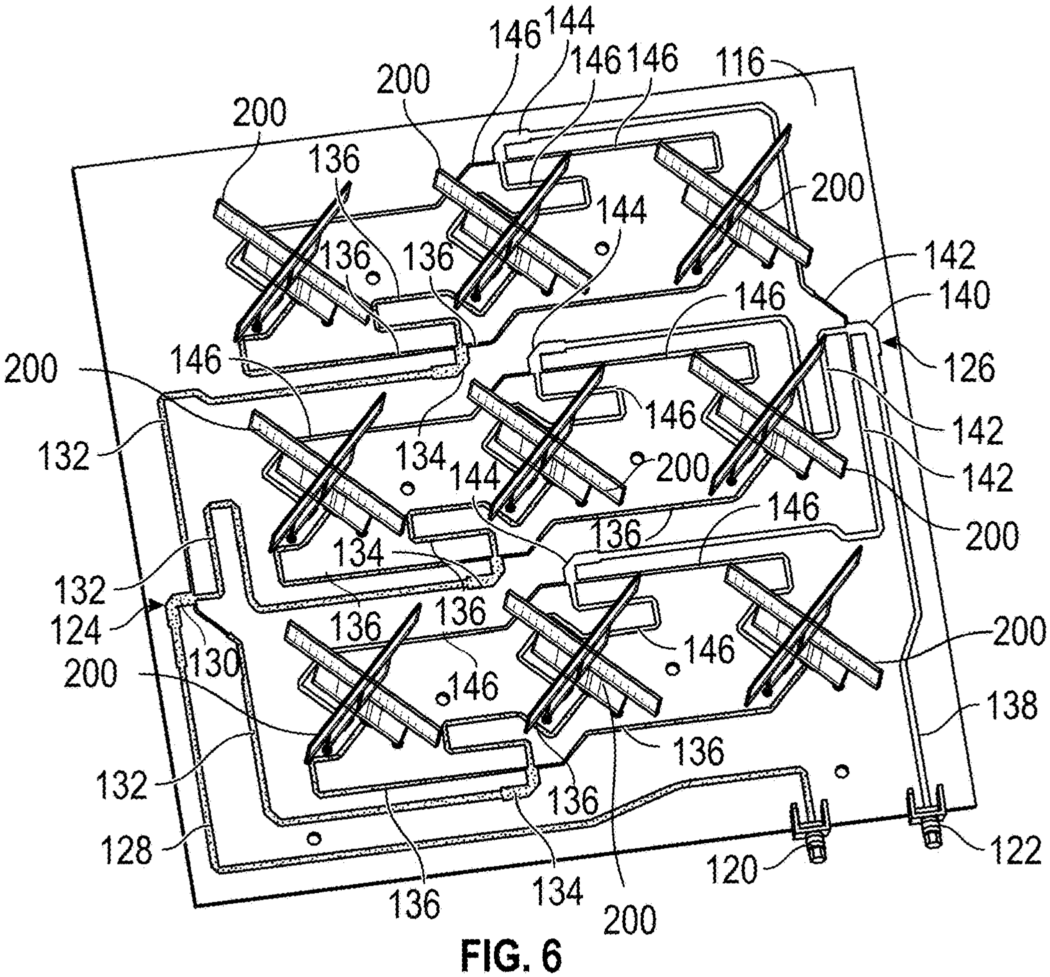
FIG. 6 illustrates a perspective isolation view of an antenna array on a PCB base of the antenna system of FIG. 1, in accordance with some aspects of this disclosure.
Figure 7:
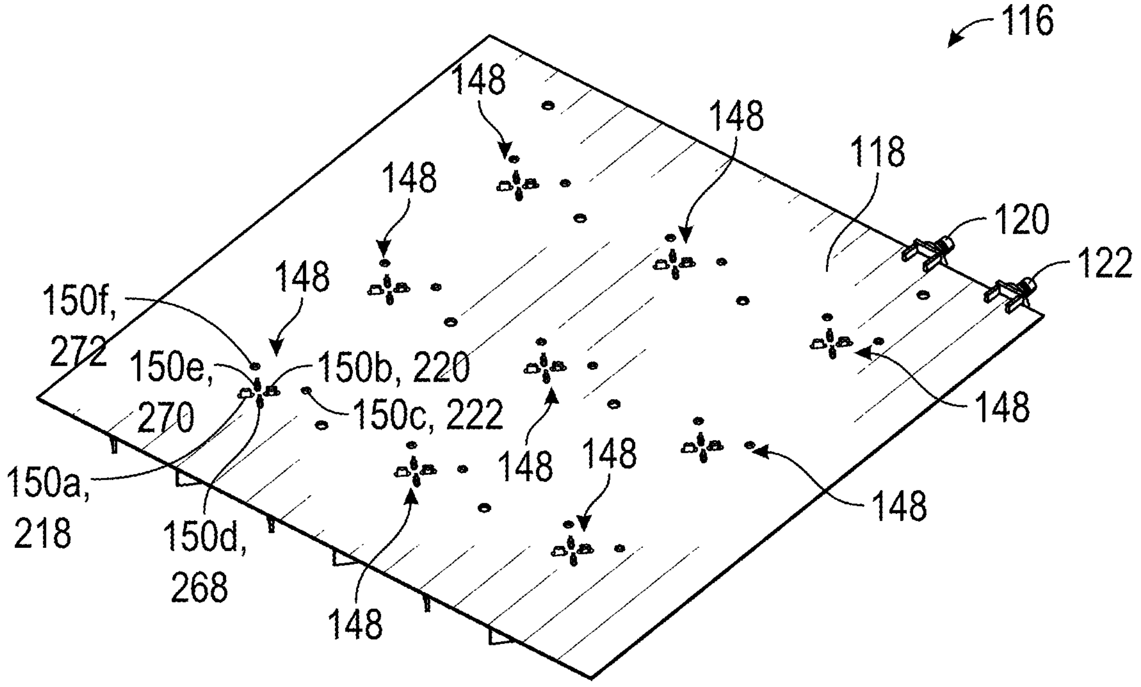
FIG. 7 illustrates a perspective view of the back side of the PCB base of FIG. 6, in accordance with some aspects of this disclosure.

Referring now to the drawings wherein like reference characters identify corresponding or similar elements in form and function throughout the several views. FIGS. 1A and 2 illustrate top perspective views of an antenna assembly that can include a multi-element multi-array ultra-wideband directional antenna system, showing the system with and without being enveloped by a non-conductive cover. FIG. 1B illustrates a bottom perspective view of an antenna assembly. FIGS. 3A, 3B, 4A, and 4B illustrate isolation views of various cooperating components that may be included in the antenna system assembly. FIG. 5 illustrates a perspective isolation view on an individual antenna of the multi-element multi-array ultra-wide-band directional antenna system on a PCB base. FIGS. 6 and 7 illustrate perspective views of a top side portion of an antenna system and a bottom side portion of an antenna system, respectively, according to some implementations.

According to some embodiments, features, and aspects of this disclosure, an ultra-wide band directional antenna array system can be used in conjunction with high order electromagnetic modes generated or received by a transceiver and/or receiver. According to some implementations, an ultra-wide band directional antenna array for mobile and client-based applications for the wireless telecommunication marketplace has a feed point, a grounding location, a tuning tap, a first portion for a balanced feed, a second portion for a balanced feed, two portions for radiation, and a common ground reference. The ground reference for the feed network serves a dual purpose for the reflector for the radiating portions. According to some preferred implementations, some or all of the radiating portions for a distinct polarization are identical. This advantageously allows for a streamlined manufacturing process for an antenna that has two orthogonal polarizations, each preferably covering from about 1800 MHz to about 4200 MHz, a 2.3:1 bandwidth. According to some implementations, the ultra-wide bandwidth and narrow elevation and azimuth beamwidths allow for an enhancement in the link budget between the base station and the mobile or client by increasing the signal strength from the base station and decreasing the received signal strength from interfering sources. Accordingly, in some implementations, this increases the signal to noise ratio which increases the data rate and allows for lower transmitted power levels which benefits all users in the wireless network. Additionally, the ultra-wide bandwidth allows for the client to receive and transmit radio signal across multiple LTE frequency bands which allows for frequency agility and frequency aggregation which further enhances the user experience. According to some implementations, an ultra-wide band directional antenna array comprises two feeding network portions, a ground reference portion, four mounting tab portions, four balun portions, four dipole arm portions, two interlocking slot portions, thirty-six top side grounding portions, and thirty-six tune tap portions.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1A, a perspective front-side view of a multi-element multi-array ultra-wide-band directional antenna assembly 100 (also referred to herein as "antenna assembly 100") is illustrated in accordance with an implementation of the present disclosure. The antenna assembly 100 may be used in a wide range of applications. The antenna assembly 100 can be a directional antenna to fixed modem locations for wireless last mile solutions. For example, the antenna assembly 100 can be used for data and voice communication. The antenna assembly 100 can be used and/or mounted to various locations. For example, the antenna assembly 100 can be located on the top or sides of buildings for wireless communications. FIG. 1B illustrates a perspective back-side view of the antenna assembly 100. The antenna assembly 100 can include a front cover 102 and a back cover 104. In FIG. 1B, the front cover 102 is shown as transparent for illustrative purposes. The covers 102, 104 can protect and/or provide mechanical support for the internal components of the antenna assembly 100 (e.g., a first antenna array 106, a second antenna array 106' discussed with reference to at least FIG. 2). For example, as discussed herein, the antenna arrays 106, 106' can be supported by the back cover 104 and enveloped by the front cover 102. In some implementations, the front cover 102 may be transparent to radiation from the antenna arrays 106, 106' and may serve as an environmental shield for the internal components of antenna assembly 100. One or both of the front cover 102 and back cover 104 can be made of non-conductive materials. For example, the covers 102, 104 may not be made of metal. In some examples, the front cover 102 can be made of plastic, fiberglass, carbon fiber, and/or the like materials that allow RF signals to pass through. The front cover 102 can be configured to be removably coupled to the back cover 104. The front cover 102 may have a rectangular bottom edge and may be prism shaped with a hollow interior. Similarly, the back cover 104 can have a rectangular top edge that is configured to interface with the bottom edge of the front cover 102. Other shapes are possible for the covers 102, 104.

With reference to FIG. 1B, the back cover 104 can include one or more attachment mechanisms. In the illustrated example, the back cover 104 include a first attachment portion 108 and a second attachment portion 110 coupled to the back side of the back cover 104. While two attachment portions 108, 110 are illustrated, the back cover 104 can include any number of attachment portions. The attachment portions 108, 110 are configured to allow the antenna assembly 100 to be mounted to various customer premise equipment (e.g., vehicles, buildings, indoor or outdoor equipment enclosures, and/or the like). The type of attachment portions 108, 110 can vary depending on the particular use. In the illustrated example, the attachment portions 108, 110 are worm gear clamps, which can be used to mount the antenna assembly 100 to poles and other structures. In other implementations, other types of attachment mechanisms can be used. For example, the type of the attachment portions 108, 110 can be chosen based on the desired mounting location.

In some cases, the attachment portions 108, 110 can be used to attach the antenna assembly 100 to a client ground plane. The client ground plane may be in the form of conducting surfaces, such as on customer premise equipment. Those skilled in the art would understand that the nature of the deployment of the antenna assembly 100 will change slightly in the deployed performance based on type of structure the antenna assembly 100 is attached to as well as the surroundings in which it is deployed. Those skilled in the art realize that the lower frequency bands of the antenna assembly 100 may work best when placed on a ground plane, but that a ground plane is not required for applications where a reduction in the level of performance of the antenna assembly 100 is acceptable. Accordingly, in some implementations, the client ground plane is not required and does not form a portion of the antenna assembly 100.

The back cover 104 can include one or more cable housings. In the illustrated example, the back cover 104 includes a first cable housing 109 and a second cable housing 111. The cable housings 109, 111 can store coaxial cables (not shown) for the antenna assembly 100. The coaxial cables are the transmission lines that allow for the radio frequency ("RF") signal to travel from the output of the radio used to establish the wireless link from the basestation to the mobile radio of the users of the wireless network. The coaxial cables may require proper connection to the particular components of the antenna assembly 100 so that it can function properly. For example, as described herein, the coaxial cables can connect to the feed networks of the antenna assembly 100 via RF ports.

As noted above, the back cover 104 forms the base of the antenna assembly 100. The back cover 104 provides mechanical support for the internal components of the antenna assembly 100. In some implementations, the back cover 104 can be electrically conductive (e.g., be made of a conductive material such as a metal), although this is not required. Having a conductive back cover 104 for the antenna assembly 100 may provide certain advantages, such as providing an electrical connection between a ground reference (see e.g., FIG. 2), which can be positioned on the back cover 104 in the assembled configuration, and the client ground plane. In some implementations, the back cover 104 includes a plurality of small gaps (not shown) in the surface of the back cover 104, which may facilitate the use of non-conductive weather resistant material. In some implementations, the size and proximity of the back cover 104 may be selected to provide an electromagnetic connection between the client ground plane and the ground reference. The combination of at least the non-conductive front cover 102 and the conductive back cover 104 provide mechanical and environmental protection for the antenna assembly 100 as well as grounding for the electrically active, radiating, portions internal to the antenna assembly 100.

As shown in FIG. 1A, the front cover 102 can be positioned on the back cover 104 to secure the internal components of the antenna assembly 100. The front cover 102 may include a plurality of fastener holes 103, shown in FIG. 1B, which may extend up the side walls of the front cover 102. In some implementations, the fastener holes 103 may be tapered. In some implementations, the fastener holes 103 may be threaded. These plurality of fastener holes 103 may be aligned with cover holes 112 of the back cover 104 (see e.g., FIG. 1B) in the assembled configuration, and fasteners 114 (see e.g., FIG. 2) can be positioned within the fastener holes 103 and the cover holes 112 to secure the front cover 102 and the internal components of the antenna assembly 100 to the back cover 104.

FIG. 2 illustrates a top perspective view of the antenna assembly 100 of FIG. 1 with the front cover 102 removed to further illustrate the internal component of the antenna assembly 100. The antenna assembly 100 can include one or more printed circuit board "PCB" base portions that support the first antenna array 106 and the second antenna array 106'. In the illustrated example, the antenna assembly 100 includes a first PCB base 116 and a second PCB base 116'. The first PCB base 116 can support the first antenna array 106. The second PCB base 116' can support the second antenna array 106'. The PCB bases 116, 116' can be housed within the antenna assembly 100 (e.g., between the front cover 102 and the back cover 104). The PCB bases 116, 116' may be made of flexible substrate materials (e.g., polyimide). As such, the PCB bases 116, 116' may be a flex circuit. In some cases, the PCB bases 116, 116' may be fiberglass reinforced with epoxy (e.g., FR4). The PCB bases 116, 116' may provide structure for the radiating portions and structures of the first antenna array 106 and second antenna array 106'.

The antenna assembly 100 can include one or more internal ground planes (also referred to herein as "ground references"). In the illustrated example, the antenna assembly 100 includes a first internal ground plane 118 (see e.g., FIG. 7) and a second internal ground plane 118'. The internal ground planes 118, 118' may serve as the ground reference for at least the first antenna array 106, the second antenna array 106', and the microstrip transmission lines of the feed networks described herein. The internal ground planes 118, 118' are configured to be housed within the antenna assembly 100 (e.g., between the front cover 102 and back cover 104). The internal ground planes 118, 118' can either be formed on the bottom side of the PCB bases 116, 116' respectively or may be separate components from the PCB bases 116, 116'. For example, the internal ground planes 118, 118' can be made of solderable sheet metal material(s) such as brass, copper, tin plated steel, and/or the like. In some implementations, the internal ground planes 118, 118' may be formed on the bottom side of the PCB bases 116, 116'. For example, the internal ground planes 118, 118' may be a conductive surface (e.g., brass, copper, tin plated steel, and/or the like) formed on the bottom side of the PCB bases 116, 116'. The internal ground planes 118, 118' may serve as a reference point for operation of the antenna assembly 100.

The first antenna array 106 can include a plurality of first antennas 200. Similarly, the second antenna array 106' can include a plurality of second antennas 200'. The plurality of first antennas 200 are arrange in the first antenna array 106 on the first PCB base 116. The plurality of second antennas 200' are arranged in the second antenna array 106' on the second PCB base 116'. The arrangement of the plurality of antennas 200, 200' is described further herein.

In the antenna assembly 100, the features of the second antenna array 106' and the plurality of second antennas 200' are similar or identical to features of the first antenna array 106 and the plurality of first antennas 200, as described herein. Thus, reference numerals used to designate the various features or components of the first antenna array 106 and the plurality of first antennas 200 are identical to those used for identifying the corresponding features of the components of the second antenna array 106' and the plurality of second antennas 200', except that the numerical identifiers for the second antenna array 106' and the plurality of second antennas 200' include a "prime". Therefore, the structure and description for the various features of the first antenna array 106 and the plurality of first antennas 200 and the operation thereof as described in FIGS. 1-7 are understood to also apply to the corresponding features of second antenna array 106' and the plurality of second antennas 200' in FIG. 1-7, except as described differently herein.

Referring to FIGS. 3A-4B, each antenna 200 of the plurality of first antennas 200 can include a first radiating portion 202 and a second radiating portion 252. The first radiating portion 202 and the second radiating portion 250 can be removably coupled together to form the antenna 200. The first radiating portion 202 can be a first dipole element for the antenna 200. The second radiating portion 252 can be a second dipole element for the antenna 200. As explained herein, the first dipole element 202 can have a first polarization and the second dipole element can have a second polarization. As such, each antenna 200 includes a dual-polarized dipole pair 202, 252.

Figure 3A:
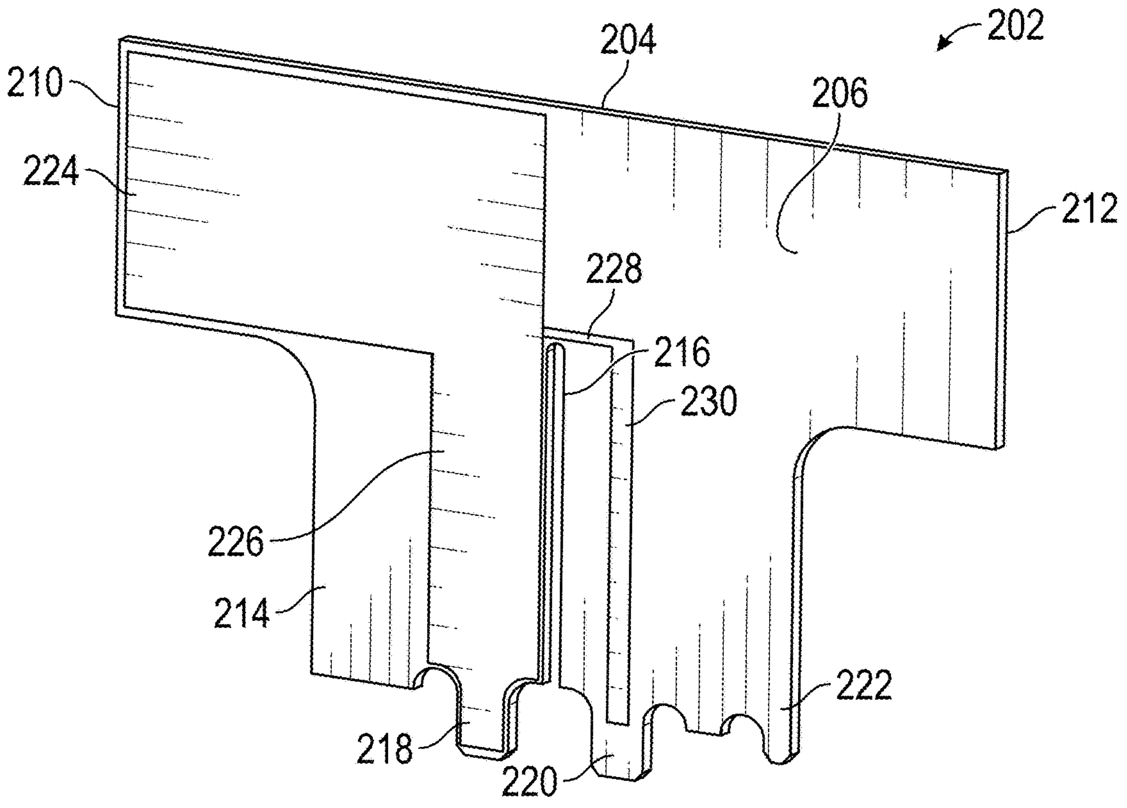
FIGS. 3A and 3B illustrate isolation views of a single radiator portion front and back side, respectively, in accordance with some aspects of this disclosure.
Figure 3B:
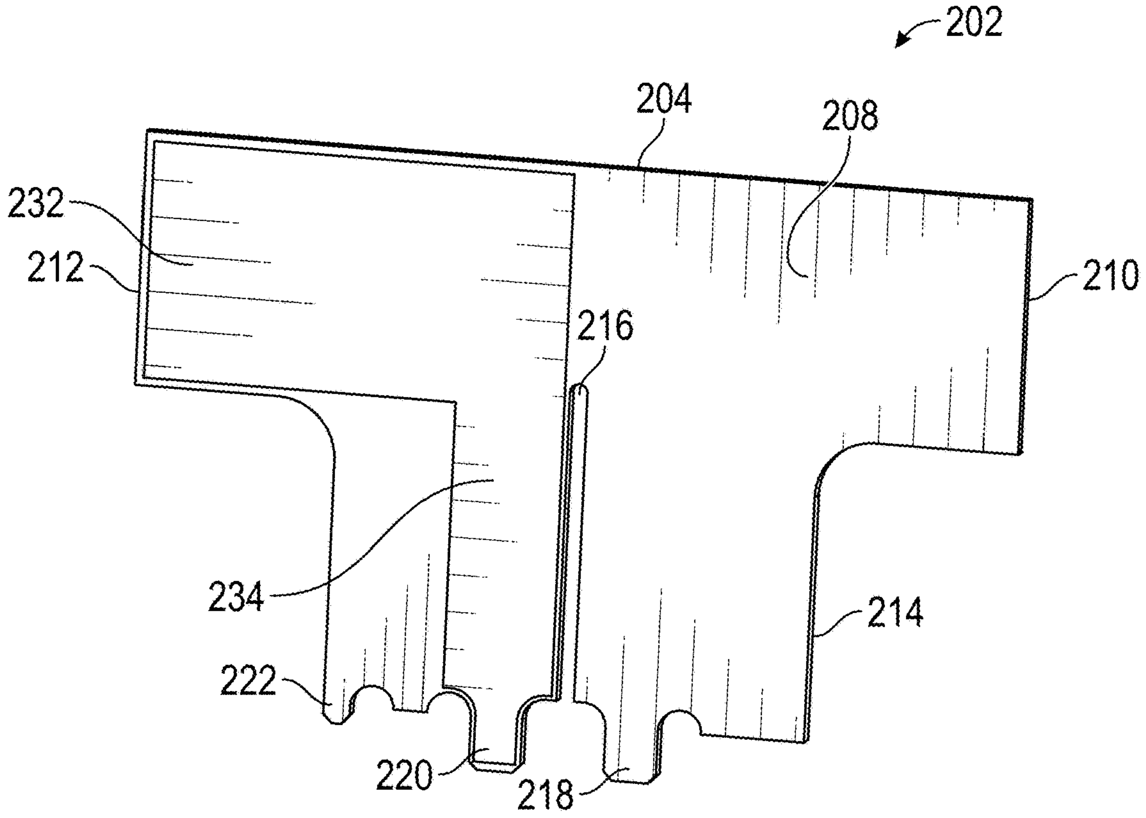

FIG. 3A illustrates a front side perspective view of the first radiating portion 202 and FIG. 3B illustrates a back side perspective view of the first radiating portion 202. The first radiating portion 202 can be a first upright PCB portion 204. The first upright PCB portion 204 has a front side 206 and a back side 208. The first upright PCB portion 204 can be T-shape. For example, the first upright PCB portion 204 can have a first arm 210, a second arm 212, and a base 214. The first upright PCB portion 204 can include a first slot 216 in the base 214. The first slot 216 can define a central axis of the first upright PCB portion 204. The first slot 216 can be open on its bottom end and can be closed on its top end. The length that the first slot 216 extends up the first upright PCB portion 204 can vary, depending on the application. The first slot 216 can be created by mechanically removing a portion from the base 214 of the first upright PCB portion 204.

The base 214 of the first upright PCB portion 204 can include one or more of a first projection 218, a second projection 220, and a third projection 222. The projections 218, 220, 222 can extend from a bottom edge of the base 214. The first projection 218 can be located on one side of the first slot 216 on the side of the first arm 210. The second projection 220 can be located on the opposite side of the first slot 216 on the side of the second arm 212. The third projection 222 can be located on an outside edge of the base 214 on the side of the second arm 212.

With reference to FIG. 3A, a first conductive portion 224 can be formed on the front side 206 of the first upright PCB portion 204. For example, the first conductive portion 224 can be etched (e.g., using copper) into the structure of the first upright PCB portion 204. The first conductive portion 224 can be located on the first arm 210. As such, the first arm 210 can function as a first dipole arm portion of the antenna 200. The first conductive portion 224 can extend from near the edge of the first arm 210 towards the central axis of the first upright PCB portion 204. The first conductive portion 224 can be rectangular.

The front side 206 of the first upright PCB portion 204 can include a first balun portion 226. The first balun portion 226 can be a conductive portion etched into the structure of the first upright PCB portion 204. The first balun portion 226 can be coupled to the first conductive portion 224. It is recognized that in the context of coupling conductive material on a PCB, such as the first conductive portion 224 and the first balun portion 226, these components can be formed from the same conductive material etched into the first upright PCB portion 204 to form the "coupling" in some implementations. The first balun portion 226 can extend from the first conductive portion 224 along an edge of the first slot 216 and along the first projection 218.

The front side 206 of the first upright PCB portion 204 can also include a feed line reactive matching portion 228 and a vertical dipole feed portion 230. Both the feed line reactive matching portion 228 and the vertical dipole feed portion 230 can be conductive portions etched into the structure of the first upright PCB portion 204. In one example, the feed line reactive matching portion 228 can be a short section of high impedance transmission line. The feed line reactive matching portion 228 can be used to provide a reactive component to the impedance matching of the first radiating portion 202. The feed line reactive matching portion 228 can be coupled to the first conductive portion 224. The feed line reactive matching portion 228 can extend horizontally from the first conductive portion 224 above the top of the first slot 216 in a direction towards the second arm 212. The vertical dipole feed portion 230 can be coupled to the feed line reactive matching portion 228. The vertical dipole feed portion 230 can extend downwardly from the feed line reactive matching portion 228 towards the second projection 220. The vertical dipole feed portion 230 can extend at least partially down the second projection 220. In some cases, the height that the feed line reactive matching portion 228 is positioned above the bottom edge of the first upright PCB portion 204 can be selected to improve the performance of the antenna 200. Similarly, the width of the first balun portion 226 and the height of the first conductive portion 224 can be selected to improve the performance of the antenna 200. In some cases, the height of the bottom edge of the first conductive portion 224 relative to the bottom edge of the first upright PCB portion 204 can be selected to improve the matching of the antenna 200.

With reference to FIG. 3B, a second conductive portion 232 can be formed on the back side 208 of the first upright PCB portion 204. For example, the second conductive portion 232 can be etched into the structure of the first upright PCB portion 204. The second conductive portion 232 can be located on the second arm 212. As such, the second arm 212 can function as a second dipole arm portion of the antenna 200. The second conductive portion 232 can extend from near the edge of the second arm 212 towards the central axis of the first upright PCB portion 204. The second conductive portion 232 can be rectangular. In some cases, the width of the first conductive portion 224 and/or the width of the second conductive portion 232 can be selected for the desired frequency band for the antenna 200.

The back side 208 of the first upright PCB portion 204 can also include a second balun portion 234. The second balun portion 234 can be a conductive portion etched into the structure of the first upright PCB portion 204. The second balun portion 234 can be coupled to the second conductive portion 232. The second balun portion 234 can extend from the second conductive portion 232 along an edge of the first slot 216 and along the second projection 220. The second balun portion 234 can be the ground plane for the vertical dipole feed portion 230 of the first radiating portion 202. For example, the second balun portion 234 can be the balun for the second dipole arm 212 and the ground plane for the vertical dipole feed portion 230 of the first radiating portion 202.

Figure 4A:
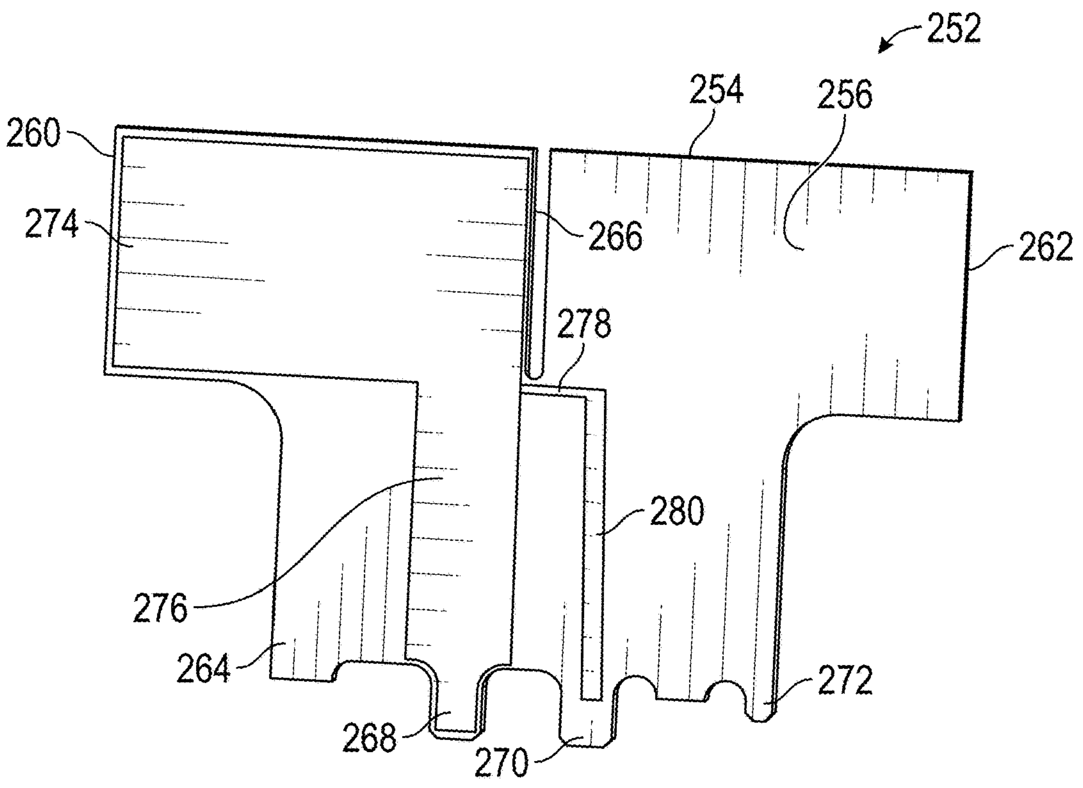
FIGS. 4A and 4B illustrate isolation views of a single radiator portion front and back side, respectively, in accordance with some aspects of this disclosure.
Figure 4B:
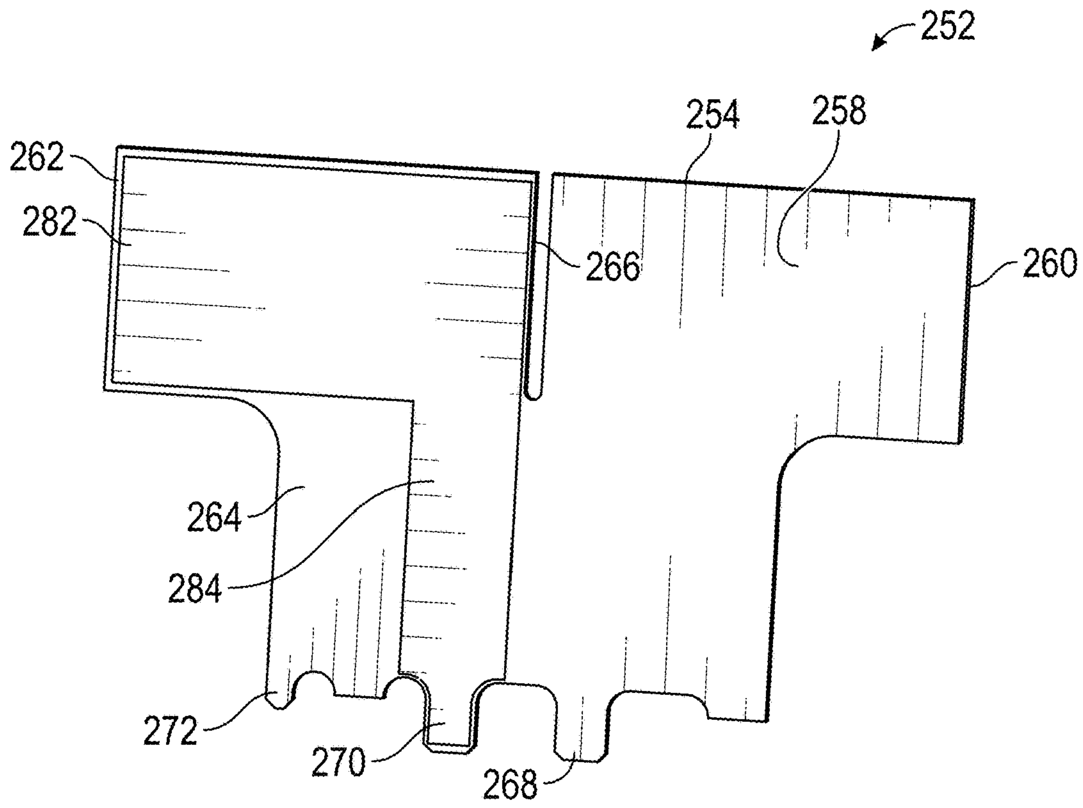

FIG. 4A illustrates a front side perspective view of the second radiating portion 252 and FIG. 4B illustrates a back side perspective view of the second radiating portion 252. The second radiating portion 252 can be a second upright PCB portion 254. The second upright PCB portion 254 can be the same shape and size as the first upright PCB portion 204. The second upright PCB portion 254 has a front side 256 and a back side 258. The second upright PCB portion 254 can be T-shape. For example, the second upright PCB portion 254 can have a third arm 260, a fourth arm 262, and a second base 264. The second upright PCB portion 254 can include a second slot 266. The second slot 266 can define a central axis of the second upright PCB portion 254. The second slot 266 can be open on its top end and can be closed on its bottom end. The second slot 266 can extend from a top edge of the second upright PCB portion 254 towards the second base 264. The length that the first slot 216 extends down the second upright PCB portion 254 can vary, depending on the application. The second slot 266 can be created by mechanically removing a portion from the second upright PCB portion 254.

The second base 264 of the second upright PCB portion 254 can include one or more of a fourth projection 268, a fifth projection 270, and a sixth projection 272. The projections 268, 270, 272 can extend from a bottom edge of the second base 264. The fourth projection 268 can be located on one side of the central axis defined by the second slot 266 on the side of the third arm 260. The fifth projection 270 can be located on the opposite side of the central axis defined by the second slot 266 on the side of the fourth arm 262. The sixth projection 272 can be located on an outside edge of the second base 264 on the side of the fourth arm 262.

With reference to FIG. 4A, a third conductive portion 274 can be formed on the front side 256 of the second upright PCB portion 254. For example, the third conductive portion 274 can be etched into the structure of the second upright PCB portion 254. The third conductive portion 274 can be located on the third arm 260. As such, the third arm 260 can function as a third dipole arm portion of the antenna 200. The third conductive portion 274 can extend from near the edge of the third arm 260 towards the central axis of the second upright PCB portion 254. The third conductive portion 274 can be rectangular.

The front side 256 of the second upright PCB portion 254 can include a third balun portion 276. The third balun portion 276 can be a conductive portion etched into the structure of the second upright PCB portion 254. The third balun portion 276 can be coupled to the third conductive portion 274. The third balun portion 276 can extend from the third conductive portion 274 along a vertical line defined by an edge of the second slot 266 inwardly of the central axis on the side of the third arm 260 and along the fourth projection 268.

The front side 256 of the second upright PCB portion 254 can also include a second feed line reactive matching portion 278 and a second vertical dipole feed portion 280. Both the second feed line reactive matching portion 278 and second vertical dipole feed portion 280 can be conductive portions etched into the structure of the second upright PCB portion 254. In one example, the second feed line reactive matching portion 278 can be a short section of high impedance transmission line. The second feed line reactive matching portion 278 can be used to provide a reactive component to the impedance matching of the second radiating portion 252. The second feed line reactive matching portion 278 can be coupled to the third conductive portion 274. The second feed line reactive matching portion 278 can extend horizontally from the third conductive portion 274 below the bottom of the second slot 266 in a direction towards the fourth arm 262. The second vertical dipole feed portion 280 can be coupled to the second feed line reactive matching portion 278. The second vertical dipole feed portion 280 can extend downwardly from the second feed line reactive matching portion 278 towards the fifth projection 270. The second vertical dipole feed portion 280 can extend at least partially down the fifth projection 270. In some cases, the height that the second feed line reactive matching portion 278 is positioned above the bottom edge of the second upright PCB portion 254 and can be selected to improve the performance of the antenna 200. Similarly, the width of the third balun portion 276 and the height of the third conductive portion 274 can be selected to improve the performance of the antenna 200. In some cases, the height of the bottom edge of the third conductive portion 274 relative to the bottom edge of the first upright PCB portion 204 can be selected to improve the matching of the antenna 200.

With reference to FIG. 4B, a fourth conductive portion 282 can be formed on the back side 258 of the second upright PCB portion 254. For example, the fourth conductive portion 282 can be etched into the structure of the second upright PCB portion 254. The fourth conductive portion 282 can be located on the fourth arm 262. As such, the fourth arm 262 can function as a fourth dipole arm portion of the antenna 200. The fourth conductive portion 282 can extend from near the edge of the fourth arm 262 towards the central axis of the second upright PCB portion 254. The fourth conductive portion 282 can be rectangular. In some cases, the width of the fourth conductive portion 282 and/or the width of the third conductive portion 274 can be selected for the desired frequency band for the antenna 200.

The back side 258 of the second upright PCB portion 254 can also include a fourth balun portion 284. The fourth balun portion 284 can be a conductive portion etched into the structure of the second upright PCB portion 254. The fourth balun portion 284 can be coupled to the fourth conductive portion 282. The fourth balun portion 284 can extend from the fourth arm 262 along a vertical line defined by an edge of the second slot 266 inwardly of the central axis on the side of the fourth arm 262 and along the fifth projection 270. The fourth balun portion 284 can be the ground plane for the second vertical dipole feed portion 280 of the second radiating portion 252. For example, the fourth balun portion 284 can be the balun for the fourth dipole arm 262 and the ground plane for the second vertical dipole feed portion 280 of the second radiating portion 252.

FIG. 5 illustrates a perspective isolation view of an individual antenna 200 mounted to a top side of the first PCB base 116 in the assembled antenna assembly 100. Each antenna 200 can be formed from one of the first radiating portions 202 and one of the second radiating portions 252. The first radiating portion 202 and the second radiating portion 252 can be coupled together by aligning the two radiating portions 202, 252 perpendicular to each other and slotting the first slot 216 onto the second slot 266. As such, the first slot 216 and second slot 266 function as interlocking slot portions. In this arrangement, the top of the first slot 216 is touching or in close proximity to the bottom of the second slot 266. In some cases, it may be preferable that the base of the projections 218, 220 are aligned on a plane with the base of the projection 268, 270. For example, the antenna 200 can stand on the four projections 218, 220, 268, and 270. The assembled antenna 200 includes four dipole arms (e.g., the first arm 210, second arm 212, third arm 260, and the fourth arm 262) with each arm including a conductive portion (e.g., the first conductive portion 224, the second conductive portion 232, third conductive portion 274, and the fourth conductive portion 282). As such, each antenna 200 includes a dual-polarized dipole pair. In some implementations, additional or alternative coupling techniques can be used to couple the first radiating portion 202 to the second radiating portion 252.

FIG. 6 illustrates a top side perspective view of the first PCB base 116 and the first antenna array 106. The plurality of antennas 200 can be coupled the top side of the first PCB base 116. Various types of coupling mechanisms can be used, as described herein. The plurality of antennas 200 can be arranged in a grid pattern on the first PCB base 116 to form the first antenna array 106. The first antenna array 106 can include any number of antennas 200. For example, the first antenna array 106 can include one, more than one, more than 5, more than 10, more than 20, and/or the like amount of antennas 200. In some cases, it can be preferable to arrange the antennas 200 in a symmetrical grid pattern. As such, the number of antennas 200 included in the first antenna array 106 can be perfect square numbers (e.g., 1, 4, 9, 16, 25, etc.). In the illustrated example, the first antenna array 106 includes nine antennas 200 arranged in a symmetrical three by three grid pattern. However, more or less antennas 200 are possible and antennas 200 can be arranged in different manners, depending on the application. The antennas 200 can be co-located on top of one another to improve the performance of the first antenna array 106.

The first PCB base 116 can include one or more independent RF ports. In the illustrated example, the first PCB base 116 includes a first RF port 120 and a second RF port 122. The RF ports 120, 122 can be used to transmit and receive high-frequency signals between different parts of the antenna assembly 100 (e.g., the antennas 200, transmitters, receivers, amplifiers, and/or other RF equipment). As shown more clearly in FIG. 2, the RF ports 120, 122 can be coupled to an inside edge of the first PCB base 116 on the edge closest to the second PCB base 116'.

The first PCB base 116 can also include one or more feed networks. In the illustrated example, the first PCB base 116 includes a first feed network 124 and a second feed network 126. The feed networks 124, 126 can be a plurality of microstrip transmission lines embedded in the first PCB base 116. As shown in FIG. 6, the feed networks 124, 126 can be arranged on the first PCB base 116 to feed each individual polarization of the antennas 200 in the first antenna array 106. Each feed network 124, 126 can include a primary microstrip transmission line, one or more secondary microstrip transmission lines, and one or more tertiary microstrip transmission lines. The number of microstrip transmission lines included in each feed networks 124, 126 can be determined by the number of antennas 200 included in the first antenna array 106. In the illustrated example, the first feed network 124 includes a first primary microstrip transmission line 128. The first primary microstrip transmission line 128 extends from the first RF port 120 to a first split point 130. At the first split point 130, three first secondary microstrip transmission lines 132 extend from the first primary microstrip transmission line 128. Each first secondary microstrip transmission lines 132 extend to a second split point 134. At each second split point 134, three first tertiary microstrip transmission lines 136 extend from the first secondary microstrip transmission line 132. Each first tertiary microstrip transmission line 136 extends to and is electrically coupled to a feed portion of a radiation portion of the antennas 200, as explained herein. Because there are nine antennas 200 in the illustrated example, there are nine first tertiary microstrip transmission lines 136. Similarly, in the illustrated example, the second feed network 126 includes a second primary microstrip transmission line 138. The second primary microstrip transmission line 138 extends from the second RF port 122 to a first split point 140. At the first split point 140, three second secondary microstrip transmission lines 142 extend from the second primary microstrip transmission line 138. Each second secondary microstrip transmission line 142 extends to a second split point 144. At each second split point 144, three second tertiary microstrip transmission lines 146 extend from the second secondary microstrip transmission line 142. Each second tertiary microstrip transmission line 146 extends to and is electrically coupled to a feed portion of a radiation portion of the antennas 200, as explained herein. Because there are nine antennas 200 in the illustrated example, there are nine second tertiary microstrip transmission lines 146. As such, the first PCB base 116 includes eighteen tertiary microstrip transmission lines 136, 146. The first RF port 120 can be electrically coupled to the first feed network 124 and can be configured to be mechanically and electrically coupled to a first coaxial cable (not shown). Similarly, the second RF port 122 can be electrically coupled to the second feed network 126 and can be configured to be mechanically and electrically coupled to a second coaxial cable (not shown).

The feed networks 124, 126 can be electrically coupled to the antennas 200. The first feed network 124 can be electrically coupled to the first radiating portions 202 of the antennas 200. For example, each first tertiary microstrip transmission line 136 can extend to and be electrically coupled to the vertical dipole feed portion 230 of each first radiating portion 202. The first tertiary microstrip transmission lines 136 are used to electrically excite the first radiating portion 202 of each antenna 200. Similarly, the second feed network 126 can be electrically coupled to the second radiating portion 250 of the antennas 200. For example, each second tertiary microstrip transmission lines 146 can extend to and be electrically coupled to the second vertical dipole feed portion 280 of each second radiating portion 252. The second tertiary microstrip transmission lines 146 are used to electrically excite the second radiating portion 252 of each antenna 200. Generally, it is desirable for the spacing between the microstrip transmission lines of the feed networks 124, 126 and the internal ground plane 118 to be less than 1 mm, which can allow the first antenna array 106 to operate effectively up to ranges of at least 6 GHz. For example, the non-conductive portion of the first PCB base 116 can be less than 1 mm thick. In some cases, 0.03 inch PCB material can be used for the PCB bases 116, 116'.

In the antenna assembly 100, the RF ports 120, 122 are used to deliver an RF signal to the antennas 200. The first RF port 120 can deliver a first RF signal with a first polarization. The second RF port 122 can deliver a second RF signal with a second polarization. The first and second polarizations can be orthogonal polarizations. For example, one of the first or second RF signals can be a vertical polarization and the other RF signal can be a horizontal polarization. As such, the antenna assembly 100 can include orthogonal polarizations. As noted above, each antenna 200 includes a dual-polarized dipole pair. In an example where the first antenna array 106 includes nine antennas 200, there can be nine dipoles in the first antenna array 106 for the first polarization and nine dipoles in the first antenna array 106 for the second polarization on the first PCB base 116. The first feed network 124 can be configured to deliver the first polarized RF signal in a manner that maintains the desired polarization. For example, for the first antenna array 106, the first feed network 124 may adjust the relative phase and amplitude of the RF signals to each first radiating portion 202 to achieve the desired polarization of the entire first antenna array 106.

Similarly, the second feed network 126 may adjust the relative phase and amplitude of the RF signals to each second radiating portion 252 to achieve the desired polarization of the first antenna array 106. In one example, each feed network 122, 124 can have an amplitude and phase that decays from the center element out to the corner element, which can allow for the desired antenna pattern over the frequency band of interest. For example, the centermost antenna 200 on the first PCB base 116 can have the maximum power and zero phase while the four corner antennas 200 on the first PCB base 116 can have the least amount of power and the maximum phase delay. The other four antennas 200 on the edge of the first PCB base 116 between the corner antennas 200 can have a power and phase delay between the centermost antenna 200 and the corner antennas 200. Those skilled in the art will recognize that the amplitude taper in the width of the microstrip transmission lines at each of the split points (e.g., the first split point 130, the second split point 134, the first split point 140, and the second split point 144) in the feed networks 124, 126. In general, the wider microstrip transmission lines (e.g., the primary microstrip transmission line 128, 138 and/or the secondary microstrip transmission lines 132, 142) carry a greater percentage of the power compared to the thinner transmission lines (e.g., the tertiary microstrip transmission lines 136, 146). In one example, the phase taper can be accomplished by the length of the non-transformer sections of the microstrip transmission lines.

FIG. 7 illustrates a bottom side view of the of the first PCB base 116 showing the internal ground plane 118. The internal ground plane 118 can serve as the ground plane or ground reference for at least the balun portions of the antennas 200 and the feed networks 124, 126. The internal ground plane 118 can be a reflector for the radiating portions 202, 252 of each antenna 200. The first PCB base 116 can include a plurality of mounting hole sets 148 for mounting/coupling the antennas 200 to the first PCB base 116. The plurality of mounting hole sets 148 can include a number of holes that extend through the first PCB base 116 and the internal ground planes 118. The number of holes include in a mounting hole set 148 can be determined by the number of projections included in the antenna 200. In the illustrated example, each antenna 200 includes six projections 218, 220, 222, 268, 270, and 272. As such, the plurality of mounting hole sets 148 can each include six holes, a first hole 150*a*, a second hole 150*b*, a third hole 150*c*, a fourth hole 150*d*, a fifth hole 150*e*, and a six hole 150*f*. The first hole 150*a* can receive the first projection 218. The second hole 150*b* can receive the second projection 220. The third hole 150*c* can receive the third projection 222. The fourth hole 150*d* can receive the fourth projection 268. The fifth hole 150*e* can receive the fifth projection 270. The six hole 150*f* can receive the sixth projection 272. For ease of illustration, only one plurality of mounting hole sets 148 are labeled in detail in FIG. 7. In some implementations, one or more of the projections can be electrically coupled to the internal ground plane 118. For example, one or more of the first projection 218, the second projection 220, the fourth projection 268, and the fifth projection 270 can be soldered to the internal ground plane 118. Soldering the projections can provide a mechanical and/or electrical coupling between the radiating portions 202, 252 of the antenna 200 and the internal ground planes 118. For example, soldering the first projection 218 can result in an electrical connection between the first conductive portion 224 and the internal ground plane 118 via the first balun portion 226. Similarly, soldering the fourth projection 268 can result in an electrical connection between the third conductive portion 274 and the internal ground plane 118 via the third balun portion 276. In another example, soldering the second projection 220 can result in an electrical connection between the second conductive portion 232 and the internal ground plane 118 via the second balun portion 234. Similarly, soldering the fifth projection 270 can result in an electrical connection between the fourth conductive portion 282 and the internal ground plane 118 via the fourth balun portion 284.

Generally, the third projection 222 of the first radiating portion 202 and the sixth projection 272 of the second radiating portion 252 function as location identification portions for the antennas 200. As such, these projections 222, 272 can assist with the placement of the antennas 200 on the first PCB base 116 and the mechanical stability of the antennas 200 but may not require an electrical connection to the ground plane 118. In some implementations, the projections 222, 272 can have an interference fit with the holes 150*c*, 150*f* respectively. In some implementations, the projections 222, 272 can be coupled to the first PCB base 116 using other conventional means.

Referring back to FIG. 5, the antennas 200 can be coupled to the top side of the first PCB base 116. As noted herein, the antennas 200 can be coupled to the first PCB base 116 via soldered connection on the internal ground plane 118 in some implementations. Additionally, or alternatively to soldering on the internal ground plane 118, one or more of the projections of the antennas 200 can be electrically coupled to the top side of the first PCB base 116 using one or more grounding portions 158 and/or one or more tune tap portions 160. For example, soldering on the internal ground plane 118 can present difficulties in manufacturing. As such, using the grounding portions 158 to ground the antenna 200 can be desirable. The grounding portions 158 and the tune tap portions 160 can be small pieces (e.g., squares) of conductive material (e.g., copper) on the two mating PCB portions (e.g., the first PCB base 116 and the first radiating portion 202 or the second radiating portion 252). The grounding portions 158 and the tune tap portions 160 can allow for soldering to provide mechanical attachments and/or electrical coupling between the mating PCB portions. For example, the one or more grounding portions 158 can be coupled to the one or more of the balun portions 226, 234, 276, 284 of the antenna 200 and the top side of the first PCB base 116. As shown in FIG. 5, the first balun portion 226 of the first radiating portion 202 is coupled to the grounding portion 158, which in turn is coupled to the first PCB base 116. While not shown in FIG. 5, each of the other balun portions (e.g., the second balun portion 234, third balun portion 276, and fourth balun portion 284) of the antenna 200 could also be coupled to the first PCB base 116 via an individual grounding portion 158. When used, the one or more tune tap portions 160 can be coupled to one or more of the vertical dipole feed portions 230, 280 of the antenna 200. As shown in FIG. 5, the second vertical dipole feed portion 280 of the second radiating portion 252 is coupled the tune tap portion 160, which in turn is coupled to a second tertiary microstrip transmission line 146. This arrangement provides an electrical connection between the second feed network 126 and the second radiating portion 252. While not shown, the vertical dipole feed portion 230 of the first radiating portion 202 can be coupled to a separate tune tap portion 160, which in turn can be coupled to a first tertiary microstrip transmission line 136. This arrangement can provide an electrical connection between the first feed network 124 and the first radiating portion 202. In some cases, the one or more tune tap portions 160 can counter act any additional inductance from the remotely located one or more grounding portions 158 for each antenna 200. When transitioning between perpendicular PCB portions, such as the first PCB base 116 and the first upright PCB portion 204 or second upright PCB portion 254, there may not be a clean impedance match. As such, the one or more tune tap portions 160 can tune out the impedance. In some cases, the first PCB base 116 can include through holes such that the grounding portions 158 can be coupled to the internal ground plane 118.

Referring back to FIG. 2, the antenna assembly 100 with the front cover 102 removed is shown. As discussed herein, the antenna assembly 100 can include the first antenna array 106 which includes the plurality of antennas 200 coupled to the first PCB base 116 and the second antenna array 106' which includes the plurality of second antennas 200' coupled to the second PCB base 116'. The features of the second PCB base 116' are similar or identical to features of the first PCB base 116, as described herein. Thus, reference numerals used to designate the various features or components of the first PCB base 116 are identical to those used for identifying the corresponding features of the components of the second PCB base 116', except that the numerical identifiers for the second PCB base 116' include a "prime". Therefore, the structure and description for the various features of the first PCB base 116 and the operation thereof as described in FIGS. 2-7 are understood to also apply to the corresponding features of second PCB base 116' in FIG. 2-7, except as described differently herein.

For ease of illustration, not all of the features of the PCB base 116' are illustrated in FIG. 2. The first PCB base 116 and the second PCB base 116' can include one or more RF ports and one or more feed networks. In the illustrated example, the second PCB base 116' includes a third RF port 120' and a fourth RF port 122'. As such, the antenna assembly 100 can be a four port antenna. The second PCB base 116' includes a third feed network 124' and a fourth feed network 126'. The RF ports 120', 122' are used to deliver RF signals to the plurality of second antennas 200'. The third RF port 120' can deliver the first RF signal with the first polarization (e.g., the same RF signal and polarization as the first RF port 120). The fourth RF port 122' can deliver the second RF signal with the second polarization (e.g., the same RF signal and polarization as the second RF port 122). In some implementations, one or both of the RF ports 120', 122' can be configured to deliver different RF signals with different polarizations than the RF ports 120, 122. Like in the first PCB base 116, the third feed network 124' delivers the RF signal to the first radiating portion 202' of the plurality of second antennas 200'. Similarly, the fourth feed network 126' delivers the RF signal to the second radiating portion 252' of the plurality of second antennas 200'. In some implementations, the antenna assembly 100 can be used by a system that has two radios, each with two ports. In some implementations, the antenna assembly 100 can be used by a system that has one radio that has four ports.

The first PCB base 116 and the second PCB base 116' can be supported by the inside of the back cover 104. The first PCB base 116 can be located on one side of the back cover 104 and the second PCB base 116' can be located on an opposite side of the back cover 104. The antenna assembly 100 can include a gap or space 162 between the first PCB base 116 and the second PCB base 116'. The space 162 can provide one or more benefits for the antenna assembly 100. For example, the space 162 can allow for RF isolation as a de-correlation (e.g., spatial diversity) between the similarly polarized first antenna array 106 on the first PCB base 116 and the second antenna array 106' on the second PCB base 116'. For a given boresight radiation direction, there are two main unique polarization of the electromagnetic waves (e.g., the vertical polarization and horizontal polarization). It can be desirable for all four RF ports 120, 122, 120', 122' of the antenna assembly 100 to have the same general direction of propagation. Having the space 162 can provide spatial diversity to have sufficient de-correlation between all four RF ports 120, 122, 120', 122' of the antenna assembly 100. In another example, the space 162 can provide room in the antenna assembly 100 for routing the coaxial cables (not shown) to the first cable housing 109 and the second cable housing 111 of the back cover 104.

In the illustrated example, the antenna assembly 100 includes the first antenna array 106 with nine first antennas 200 and the second antenna array 106' with nine identical second antennas 200'. Those skilled in the art will realize that modifications can be made for specific cases such that the second antennas 200' may not be identical to the first antennas 200. Because of the two unique radiator portions in each antenna 200, 200' (e.g., the first radiating portions 202, 202' and the second radiating portion 252, 252') there can be eighteen unique dual-polarized dipole pairs in the assembled antenna assembly 100. For example, each first antenna 200 and second antenna 200' is formed from an orthogonal dipole pair. As noted above, the first antennas 200 of the first antenna array 106 can be spaced in a symmetrical grid pattern. Similarly, the second antennas 200' of the second antenna array 106' can be spaced in an identical symmetrical grid pattern. In some cases, the spacing of the grid pattern, the amplitude and phase taper in the feed networks 124, 124', 126, 126', and/or the tuning of the dipoles in the antennas 200, 200' can allow for a 2.3:1 bandwidth for return loss, isolation, elevation pattern, and azimuth pattern.

As explained herein, the feed networks 124, 126 for the first antenna array 106 can be configured to be very similar or identical to the feed networks 124', 126' for the second antenna array 106', with only limited or minor alterations made by those skilled in the art. These attributes can provide certain advantages. For example, there can be manufacturing benefits of having identical antennas 200, 200' and identical PCB bases 116, 116' in the antenna assembly 100. These attributes also may provide a benefit of uniform coverage and interference patterns in the wireless network for each of the four RF ports 120, 122, 120', 122'. The four RF ports 120, 122, 120', 122' of the antenna assembly 100 can allow for Multiple-Input Multiple-Output ("MiMo") operation of the client or end user radio. For example, higher order MiMo operation can allow for greater efficiency of the wireless spectrum for data rates per user as well as users per radio channel. The higher order MiMo can be further achieved by adding additional space inside the front cover 102 and back cover 104 for additional structures (e.g., additional antennas 200, 200') for larger antenna arrays 106, 106', which would increase the number of orthogonal dipole pairs per RF port 120, 122, 120', 122'.

The particular implementations disclosed above are illustrative only, as the application may be modified and practiced in different but equivalent manners apparent to those skilled in the art having the benefit of the teachings herein. It is therefore evident that the particular implementations disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

EXAMPLE CLAUSES

Various examples of systems relating to an antenna system are found in the following clauses:

Clause 1. An antenna assembly comprising: a front cover; a back cover; a first ground reference portion positioned between the front cover and the back cover; and a first antenna array coupled to the first ground reference portion, the first antenna array comprising a plurality of first antennas.

Clause 2. The antenna assembly of Clause 1, wherein each first antenna of the plurality of first antennas comprises: a first radiation portion comprising: a first dipole arm; a second dipole arm; and a first base; and a second radiation portion comprising: a third dipole arm; a fourth dipole arm; and a second base; wherein the first radiation portion is coupled to the second radiation portion.

Clause 3. The antenna assembly of Clause 2, wherein the first radiation portion comprises a first slot and the second radiation portion comprises a second slot, wherein the first slot is configured to interlock with the second slot such that the first radiation portion is orthogonal to the second radiation portion.

Clause 4. The antenna assembly of Clause 2 or Clause 3, wherein the first radiation portion comprises a first front side and a first back side, wherein a first conductive portion is formed on the first front side on the first dipole arm and a second conductive portion is formed on the first back side on the second dipole arm.

Clause 5. The antenna assembly of Clause 4, wherein the first radiation portion comprises: a first balun portion on the first front side, the first balun portion extending from the first conductive portion and along the first base; and a second balun portion on the first back side, the second balun portion extending from the second conductive portion and along the first base.

Clause 6. The antenna assembly of Clauses 4 or 5, wherein the first radiation portion comprises a first feed line and a first feed portion, the first feed line extending from the first conductive portion in a direction towards the second dipole arm, the first feed portion extending from the first feed line along the first base.

Clause 7. The antenna assembly of any of Clauses 2-6, wherein the second radiation portion comprises a second front side and a second back side, wherein a third conductive portion is formed on the second front side on the third dipole arm and a fourth conductive portion is formed on the second back side on the fourth dipole arm.

Clause 8. The antenna assembly of Clause 7, wherein the second radiation portion comprises: a third balun portion on the second front side, the third balun portion extending from the third conductive portion and along the second base; and a fourth balun portion on the second back side, the fourth balun portion extending from the fourth conductive portion and along the second base.

Clause 9. The antenna assembly of Clauses 7 or 8, wherein the second radiation portion comprises a second feed line and a second feed portion, the second feed line extending from the third conductive portion in a direction towards the fourth dipole arm, the second feed portion extending from the second feed line along the second base.

Clause 10. The antenna assembly of any of Clauses 2-9, wherein the first base comprises a first projection and a second projection, the first and second projections extending from a first bottom edge of the first base, wherein the second base comprises a third projection and a fourth projection, the third and fourth projections extending from a second bottom edge of the second base.

Clause 11. The antenna assembly of Clause 10, wherein the first balun portion extends at least partially along the first projection and the second balun portion extends at least partially along the second projection.

Clause 12. The antenna assembly of Clause 10 or Clause 11, wherein the third balun portion extends at least partially along the third projection and the fourth balun portion extends at least partially along the fourth projection.

Clause 13. The antenna assembly of any of Clauses 1-12, wherein the first ground reference portion comprises a first feed network comprising a plurality of first microstrip transmission lines and a second feed network comprising a plurality of second microstrip transmission lines.

Clause 14. The antenna assembly of Clause 13, wherein each first microstrip transmission line of the plurality of first microstrip transmission lines is electrically coupled to the first feed portion of one first antenna of the plurality of first antennas.

Clause 15. The antenna assembly of Clause 13 or Clause 14, wherein each second microstrip transmission line of the plurality of second microstrip transmission lines is electrically coupled to the second feed portion of one first antenna of the plurality of first antennas.

Clause 16. The antenna assembly of any of Clauses 13-15, wherein the first feed network is electrically coupled to a first radiofrequency port and the second feed network is electrically coupled to a second radiofrequency port.

Clause 17. The antenna assembly of Clause 16, wherein the first radiofrequency port is configured to transmit a first radiofrequency signal with a first polarization and the second radiofrequency port is configured to transmit a second radiofrequency signal with a second polarization.

Clause 18. The antenna assembly of any of Clauses 10-17, wherein the first ground reference portion comprises a plurality of hole groups, each hole group of the plurality of hole groups comprising four holes extending through the first ground reference portion, each hole of the four holes configured to receive one of the first projection, the second projection, the third projection, or the fourth projection of each first antenna.

Clause 19. The antenna assembly of any of Clauses 1-18, further comprising: a second ground reference portion positioned between the front cover and the back cover; and a second antenna array coupled to the second ground reference portion, the second antenna array comprising a plurality of second antennas.

Clause 20. The antenna assembly of Clause 19, wherein the plurality of second antennas is identical to the plurality of first antennas.

Clause 21. The antenna assembly of any of Clauses 1-20, wherein the antenna assembly is configured to be used by a system that has a first radio with two first ports and a second radio with two second ports.

Clause 22. The antenna assembly of any of Clauses 1-20, wherein the antenna assembly is configured to be used by a system that has a first radio with four first ports.

Clause 23. An ultra-wide band directional antenna array, comprising: a ground reference portion; a first feeding network portion formed on the ground reference portion; a second feeding network portion formed on the ground reference portion; and a plurality of antennas, each antenna of the plurality of antennas coupled to the first feeding network portion and the second feeding network portion.

Clause 24. The ultra-wide band directional antenna array of Clause 23, wherein each antenna of the plurality of antennas comprises four dipole arm portions.

Clause 25. The ultra-wide band directional antenna array of Clause 23 or Clause 24, wherein each antenna of the plurality of antennas comprises four balun portions.

Clause 26. The ultra-wide band directional antenna array of any of Clauses 23-25, wherein each antenna of the plurality of antennas comprises two interlocking slot portions.

Clause 27. The ultra-wide band directional antenna array of any of Clauses 23-26, further comprising a plurality of top side grounding portions, wherein each antenna of the plurality of antennas is coupled to two top side grounding portions of the plurality of top side grounding portions.

Clause 28. The ultra-wide band directional antenna array of any of Clauses 23-27, further comprising a plurality of tune tap portions, where each antenna of the plurality of antennas is coupled to two tune tap portions of the plurality of tune tap portions.

Clause 29. The ultra-wide band directional antenna array of any of Clauses 23-28, wherein the plurality of antennas comprises a square number of antennas arranged in a symmetrical grid on the ground reference portion.

Clause 30. The ultra-wide band directional antenna array of any of Clauses 23-29, further comprising: a third feeding network portion formed on the ground reference portion; a fourth feeding network portion formed on the ground reference portion; and a plurality of second antennas, each second antenna of the plurality of a second antennas coupled to the third feeding network portion and the fourth feeding network portion.

Clause 31. The ultra-wide band directional antenna array of Clause 30, wherein each second antenna of the plurality of second antennas comprises four second dipole arm portions.

Clause 32. The ultra-wide band directional antenna array of Clause 30 or Clause 31, wherein each second antenna of the plurality of second antennas comprises four second balun portions.

Clause 33. The ultra-wide band directional antenna array of any of Clauses 30-32, wherein each second antenna of the plurality of second antennas comprises two second interlocking slot portions.

Clause 34. The ultra-wide band directional antenna array of any of Clauses 30-33, further comprising a plurality of second top side grounding portions, wherein each second antenna of the plurality of second antennas is coupled to two second top side grounding portions of the plurality of second top side grounding portions.

Clause 35. The ultra-wide band directional antenna array of any of Clauses 30-34, further comprising a plurality of second tune tap portions, where each second antenna of the plurality of second antennas is coupled to two second tune tap portions of the plurality of second tune tap portions.

Clause 36. The ultra-wide band directional antenna array of any of Clauses 30-35, wherein the plurality of second antennas comprises a square number of second antennas arranged in a second symmetrical grid on the ground reference portion.

Clause 37. The ultra-wide band directional antenna array of Clause 36, wherein the ultra-wide band directional antenna array includes a same number of antennas and second antennas.

Clause 38. The ultra-wide band directional antenna array of any of Clauses 23-29, further comprising: a second ground reference portion; a third feeding network portion formed on the second ground reference portion; a fourth feeding network portion formed on the second ground reference portion; and a plurality of second antennas, each second antenna of the plurality of a second antennas coupled to the third feeding network portion and the fourth feeding network portion.

Clause 39. The ultra-wide band directional antenna array of Clause 38, wherein each second antenna of the plurality of second antennas comprises four second dipole arm portions.

Clause 40. The ultra-wide band directional antenna array of Clause 38 or Clause 39, wherein each second antenna of the plurality of second antennas comprises four second balun portions.

Clause 41. The ultra-wide band directional antenna array of any of Clauses 38-40, wherein each second antenna of the plurality of second antennas comprises two second interlocking slot portions.

Clause 42. The ultra-wide band directional antenna array of any of Clauses 38-41, further comprising a plurality of second top side grounding portions, wherein each second antenna of the plurality of second antennas is coupled to two second top side grounding portions of the plurality of second top side grounding portions.

Clause 43. The ultra-wide band directional antenna array of any of Clauses 38-42, further comprising a plurality of second tune tap portions, where each second antenna of the plurality of second antennas is coupled to two second tune tap portions of the plurality of second tune tap portions.

Clause 44. The ultra-wide band directional antenna array of any of Clauses 38-43, wherein the plurality of second antennas comprises a square number of second antennas arranged in a second symmetrical grid on the ground reference portion.

Clause 45. The ultra-wide band directional antenna array of Clause 44, wherein the ultra-wide band directional antenna array includes a same number of antennas and second antennas.

Clause 46. An antenna assembly comprising: a front cover; a back cover; one or more ground reference portions positioned between the front cover and the back cover; a first antenna array coupled to the one or more ground reference portions, the first antenna array comprising a plurality of first antennas; and a second antenna array coupled to the one or more ground reference portions, the second antenna array comprising a plurality of second antennas; wherein the first antenna array has a first polarization configured to cover a frequency range of 1800 MHz to 4200 MHz, wherein the second antenna array has a second polarization configured to cover a frequency range of 1800

MHz to 4200 MHz, wherein the first polarization is orthogonal to the second polarization.

Clause 47. The antenna assembly of Clause 46, wherein the first polarization and the second polarization are configured to cover a 2.3:1 bandwidth.

Clause 48. The antenna assembly of Clause 46 or Clause 47, wherein the antenna assembly is configured to receive and transmit radio signals across multiple LTE frequency bands.

ADDITIONAL CONSIDERATIONS AND TERMINOLOGY

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An ultra-wide band directional antenna array, comprising:
- a base portion comprising:
  - a top surface; and
  - a bottom surface, the bottom surface comprising a conductive material;
- a first feeding network formed on the top surface of the base portion;
- a second feeding network formed on the top surface of the base portion;
- a plurality of antennas disposed on the top surface of the base portion, each antenna of the plurality of antennas electrically coupled to the first feeding network and the second feeding network;
- a second base portion positioned beside the base portion, the second base portion comprising:
  - a top surface; and
  - a bottom surface, the bottom surface comprising a conductive material;
- a third feeding network formed on the top surface of the second base portion;
- a fourth feeding network formed on the top surface of the second base portion; and a plurality of second antennas disposed on the top surface of the second base portion, each second antenna of the plurality of second antennas electrically coupled to the third feeding network and the fourth feeding network.

2. The ultra-wide band directional antenna array of claim 1, wherein each antenna of the plurality of antennas comprises four dipole arm portions and four balun portions.

3. The ultra-wide band directional antenna array of claim 2, wherein the four dipole arm portions comprise a first dipole arm, a second dipole arm, a third dipole arm, and a fourth dipole arm, wherein the first dipole arm and the second dipole arm are directly coupled, and wherein the third dipole arm and the fourth dipole arm are directly coupled.

4. The ultra-wide band directional antenna array of claim 1, wherein each antenna of the plurality of antennas comprises two interlocking slot portions.

5. The ultra-wide band directional antenna array of claim 1, wherein the base portion further comprises a plurality of top side grounding portions, wherein each antenna of the plurality of antennas is coupled to two top side grounding portions of the plurality of top side grounding portions.

6. The ultra-wide band directional antenna array of claim 1, wherein the base portion further comprises a plurality of tune tap portions, where each antenna of the plurality of antennas is coupled to two tune tap portions of the plurality of tune tap portions.

7. The ultra-wide band directional antenna array of claim 1, wherein the plurality of antennas comprises a square number of antennas arranged in a symmetrical grid on the base portion.

8. The ultra-wide band directional antenna array of claim 1, wherein each second antenna of the plurality of second antennas comprises four second dipole arm portions, and wherein each second antenna of the plurality of second antennas comprises four second balun portions.

9. The ultra-wide band directional antenna array of claim 1, wherein each second antenna of the plurality of second antennas comprises two second interlocking slot portions.

10. The ultra-wide band directional antenna array of claim 1, wherein the second base portion further comprises a plurality of second top side grounding portions, and wherein each second antenna of the plurality of second antennas is coupled to two second top side grounding portions of the plurality of second top side grounding portions.

11. The ultra-wide band directional antenna array of claim 1, wherein the second base portion further comprises a plurality of second tune tap portions, where each second antenna of the plurality of second antennas is coupled to two second tune tap portions of the plurality of second tune tap portions.

12. The ultra-wide band directional antenna array of claim 1, wherein the plurality of second antennas comprises a square number of second antennas arranged in a second symmetrical grid on the second base portion.

13. The ultra-wide band directional antenna array of claim 1, wherein the ultra-wide band directional antenna array includes a same number of antennas and second antennas.

14. The ultra-wide band directional antenna array of claim 1, wherein the plurality of antennas have a first polarization configured to cover a frequency range of 1800 MHz to 4200 MHz, wherein the plurality of second antennas have a second polarization configured to cover a frequency range of 1800 MHz to 4200 MHz, and wherein the first polarization is orthogonal to the second polarization.

15. The ultra-wide band directional antenna array of claim 14, wherein the first polarization and the second polarization are configured to cover a 2.3:1 bandwidth.

16. The ultra-wide band directional antenna array of claim 14, wherein the ultra-wide band directional antenna array is configured to receive and transmit radio signals across multiple LTE frequency bands.

17. The ultra-wide band directional antenna array of claim 1, wherein the first feeding network comprises a plurality of first microstrip transmission lines and the second feeding network comprises a plurality of second microstrip transmission lines.

18. The ultra-wide band directional antenna array of claim 17, wherein each first microstrip transmission line of the plurality of first microstrip transmission lines is electrically coupled to a first feed portion of one antenna of the plurality of antennas, wherein each second microstrip transmission line of the plurality of second microstrip transmission lines is electrically coupled to a second feed portion of one antenna of the plurality of antennas.

19. The ultra-wide band directional antenna array of claim 17, wherein the first feeding network is electrically coupled to a first radiofrequency port and the second feeding network is electrically coupled to a second radiofrequency port, wherein the first radiofrequency port is configured to transmit a first radiofrequency signal with a first polarization and the second radiofrequency port is configured to transmit a second radiofrequency signal with a second polarization.

* * * * *